(12) United States Patent
Nikkanen et al.

(10) Patent No.: US 9,398,280 B2
(45) Date of Patent: Jul. 19, 2016

(54) AWB USING FACE DETECTION

(71) Applicants: Jarno Nikkanen, Kangasala (FI); Petri Ahonen, Tampere (FI); Timo Kaikumaa, Nokia (FI)

(72) Inventors: Jarno Nikkanen, Kangasala (FI); Petri Ahonen, Tampere (FI); Timo Kaikumaa, Nokia (FI)

(73) Assignee: INTEL CORPORATION, Santa Clara, CA (US)

( * ) Notice: Subject to any disclaimer, the term of this patent is extended or adjusted under 35 U.S.C. 154(b) by 79 days.

(21) Appl. No.: 14/129,417

(22) PCT Filed: Aug. 26, 2013

(86) PCT No.: PCT/US2013/056612
§ 371 (c)(1),
(2) Date: Dec. 26, 2013

(87) PCT Pub. No.: WO2015/030705
PCT Pub. Date: Mar. 5, 2015

(65) Prior Publication Data
US 2015/0054980 A1  Feb. 26, 2015

(51) Int. Cl.
*H04N 9/64* (2006.01)
*H04N 9/73* (2006.01)
*G06K 9/00* (2006.01)
*G06K 9/62* (2006.01)

(52) U.S. Cl.
CPC .............. *H04N 9/643* (2013.01); *H04N 9/735* (2013.01); *G06K 9/00234* (2013.01); *G06K 9/6223* (2013.01)

(58) Field of Classification Search
None
See application file for complete search history.

(56) References Cited

U.S. PATENT DOCUMENTS

| | | | |
|---|---|---|---|
| 6,377,702 B1 | 4/2002 | Cooper | |
| 6,898,312 B2 | 5/2005 | Schroder | |
| 7,728,904 B2 | 6/2010 | Quan et al. | |
| 8,023,736 B2 | 9/2011 | Tsukada | |
| 8,045,047 B2 | 10/2011 | Nikkanen | |
| 8,103,094 B2 | 1/2012 | Wilensky | |
| 8,154,612 B2 | 4/2012 | Quan et al. | |
| 8,340,452 B2 | 12/2012 | Marchesotti | |
| 8,941,755 B2 | 1/2015 | Nikkanen | |
| 2003/0001958 A1 | 1/2003 | Hoshuyama | |
| 2005/0280809 A1* | 12/2005 | Hidai et al. | 356/237.3 |
| 2006/0029265 A1* | 2/2006 | Kim et al. | 382/118 |
| 2006/0066912 A1 | 3/2006 | Kagaya | |
| 2007/0097392 A1 | 5/2007 | Chien | |
| 2009/0002519 A1 | 1/2009 | Nakamura | |
| 2010/0123802 A1* | 5/2010 | Kim | 348/234 |

FOREIGN PATENT DOCUMENTS

KR 10-2012-0021103 A 3/2012

OTHER PUBLICATIONS

International Search Report and Written Opinion received for PCT Patent Application No. PCT/US2013/056612, mailed on May 26, 2014, 12 pages.
Elgammal, et al., "Skin Detection—a Short Tutorial," entry in Encyclopedia of Biometrics by Springer-Verlag Berlin Heidelberg, 2009, 10 pages.

(Continued)

*Primary Examiner* — Roberto Velez
*Assistant Examiner* — Yih-Sien Kao

(57) ABSTRACT

A method, system, and article provide automatic white balancing with skin tone correction for image processing.

18 Claims, 9 Drawing Sheets

(56) References Cited

OTHER PUBLICATIONS

Nikkanen, et al., "Subjective effects of white-balancing errors in digital photography," Optical Engineering 47(11), Nov. 2008, 15 pages.

Jarno T. Nikkanen, "Color constancy by characterization of illumination chromaticity," Optical Engineering 50(5), May 2011, 15 pages.

Rahtu, et al., "Applying Visual Object Categorization and Memory Colors for Automatic Color Constancy," Image Analysis and Processing—ICIAP 2009, 10 pages.

Sun, et al., "Statistical Characterization of Face Spectral Reflectances and Its Application to Human Portraiture Spectral Estimation," The Journal of Imaging Science and Technology, 2002, 36 pages.

\* cited by examiner

AWB USING FACE DETECTION

BACKGROUND

Digital image processing devices, such as digital cameras, use automatic white balancing (AWB) in order to provide accurate colors for pictures reproduced from captured images. AWB is a process that finds or defines the color white in a picture called the white point. The other colors in the picture are determined relative to the white point. The AWB adjusts the gains of different color components (for example, red, green, and blue) with respect to each other in order to present white objects as white, despite the color temperature differences of the image scenes or different sensitivities of the color components. When the white point is incorrect, however, the reproduced image may include erroneous colors. These color errors may occur because of manufacturing variances among cameras, whether in the hardware or software, which can cause variations in chromaticity response or color shading. Also, residual shading issues may exist that introduce false colors into the image. This may occur due to difficult lighting (illumination) situations such as a mix of daylight and other human-manufactured light sources for example. The AWB module may then use the false colors in its calculations leading to even further degradation of the reproduced image. Otherwise, uni-colored images, when no clear white point exists in the image, also tend to be difficult for AWB algorithms to process leading to erroneous colors.

One type of color error caused by an erroneous white point is called a color cast where an entire image, parts of an image, or certain objects within the image have the same incorrect shade. For human faces or skin, even slight errors in skin color or skin tone can be easily detected by the average person viewing the image. Thus, when color cast exists on a human face or other areas of skin in a picture, the face or skin may seem too purple, blue, red, green, pink, grey, or yellow for example.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
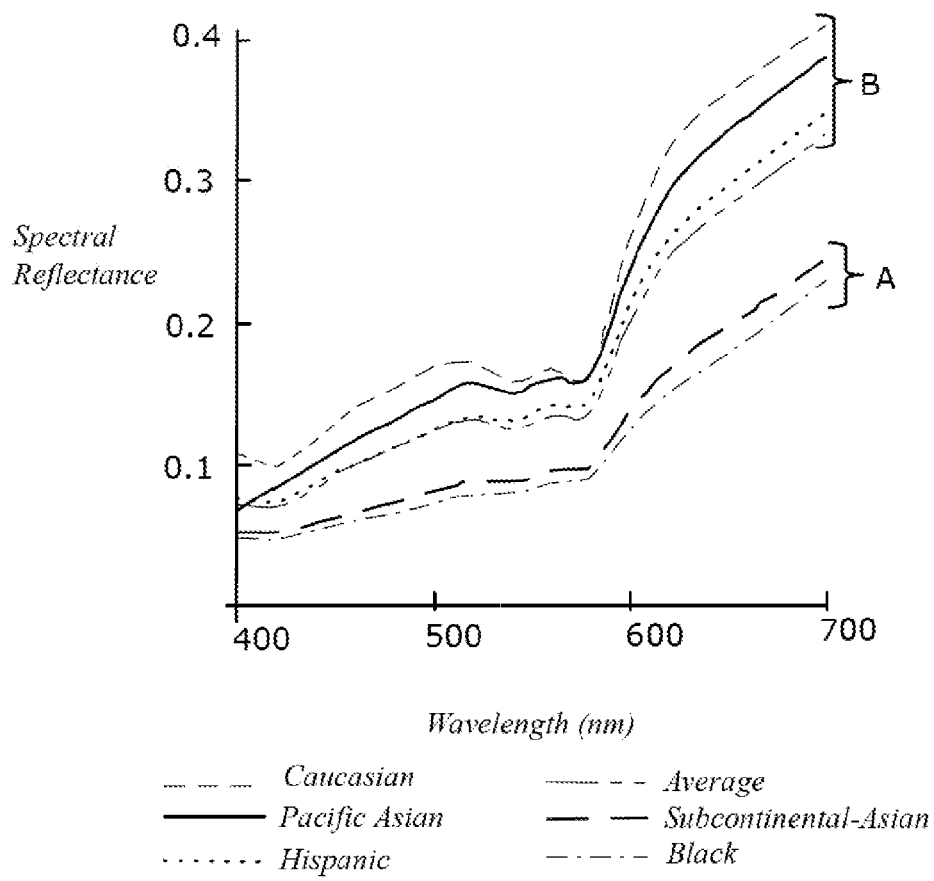
FIG. 1 is an illustrative chart establishing the spectral reflectance of human skin tones.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

Systems, articles, and methods are described below including automatic white balancing with skin tone correction for image processing.

As mentioned above automatic white balancing (AWB) for imaging processing devices, such as digital cameras for one non-limiting example, is used to correct the white point for an image, and therefore the color reference point for all of the other colors on an image. AWB algorithms are used to set the white point, but this process is susceptible to error whether from manufacturing tolerances at the sensors, effects of illumination or the contents of the image that form false colors, and so forth. These errors may be especially noticeable when the error results in color cast on human faces or skin in an image such that the human face may appear too purple, green, blue, or yellow, or some other unnatural color.

In order to avoid these errors, one approach has been to use face detection techniques. Once it has been determined that a certain region on an image should be a human face or area with human skin, for example, it is determined whether that region on the image has a skin chromaticity that is positioned within a single, known chromaticity cluster of skin tones on a color space. This cluster is defined, for example, in a chromaticity space by normalizing R and B sensor components with G. If the skin chromaticity is not within the cluster, it is then moved to the cluster, and the corresponding change in white point is calculated. The other colors in the image are then also determined based on this new white point. However, the single skin tone or skin type cluster has proven to be too inaccurate such that noticeable errors in skin tone (color cast for example) may still occur.

Figure 2:
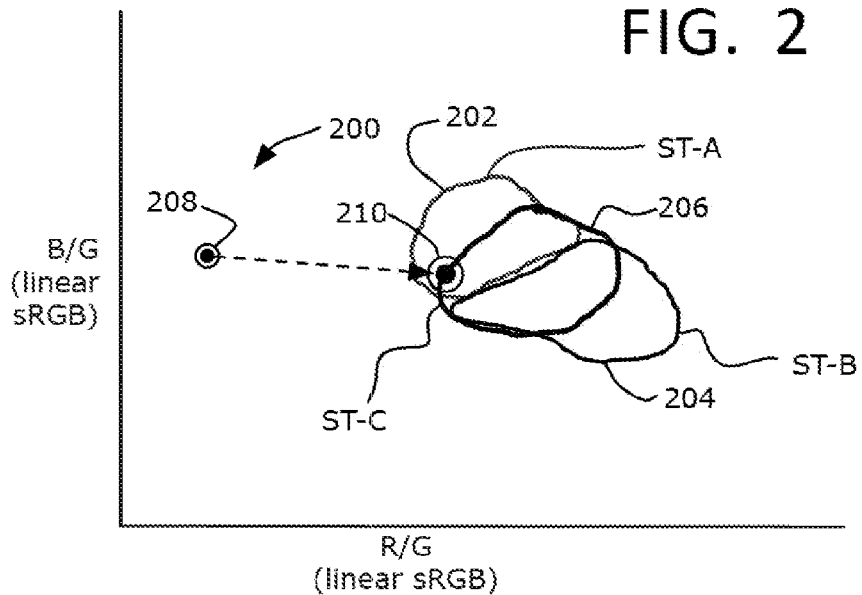
FIG. 2 is an illustrative chart for an exemplary automatic white balancing configuration.

Referring to FIGS. 1-2, a more accurate representation of human skin tones has been established, and the system disclosed herein takes advantage of this representation. Specifically, it has been found that two skin type chromaticity clusters may be established in chromaticity space, at least one for darker skin types, and at least one for lighter skin types based on spectral reflectance. See, Q. Sun, M. D. Fairchild, "Statistical Characterization of Face Spectral Reflectances and Its Application to Human Portraiture Spectral Estimation", Munsell Color Science Laboratory (2002), p. 27. A chart is provided showing how the spectral reflectance is similar for Subcontinental-Asian and African (also referred to as black) skin types within the visible region 400 to 700 nm wavelengths, thereby defining a darker skin type group, and annotated on FIG. 1 as skin type group A. Similarly, Caucasian, Pacific-Asian, Hispanic, as well as the over-all average skin types have similar spectral reflectances, and form a second lighter skin type chromaticity group, annotated on FIG. 1 as skin type group B.

By one example approach illustrated in FIG. 2, the two known spectral reflectance groups A and B may be used to form a respective, distinct, skin type specific chromaticity clusters in the chromaticity space 200. The illustrated example shows the clusters in linear sRGB space with red (R) and blue (B) components divided by green (G). It will be understood that the clusters may exist in many different color spaces for use by the disclosed system and methods herein such as the UV plane of YUV color space, CbCr plane of YCbCr color space, ab plane of Lab color space, or HS of the HSV color space, other examples, or any combinations thereof. The clusters may also be formed in three-dimensional space rather than the two-dimensional space as in the illustrated example. Herein, group A forms a darker skin type chromaticity cluster 202 indicated as ST-A. Group B forms a lighter skin type chromaticity cluster 204 indicated as ST-B. It should be noted that the terms dark and light, including for example darker skin type or tone (such as black) versus lighter skin type or tone (such as Caucasian), discussed herein refers to the chromaticity of the skin type (for example, the combinations of red, green, and blue), and in one form as grouped or defined by the clusters, and rather than brightness or luminance unless mentioned otherwise. Thus, at a minimum, herein this application the darker skin type cluster ST-A refers to the inclusion of the skin type black or African, while the lighter skin type cluster ST-B refers to the inclusion of the skin type Caucasian, regardless as to whether any skin types in one cluster has more luminance than a skin type in the other cluster.

As will be described in greater detail below, operations for automatic white balancing and increasing the accuracy of skin tones on an image may be implemented by determining the likelihood or probability that the chromaticity of a point 208 on a color space, and associated with a point or detected skin-related object on an image, should be in chromaticity cluster ST-A, and separately the likelihood that the chromaticity point 208 should be in chromaticity cluster ST-B. The point 208 may also be referred to as a skin chromaticity point. Depending on at least one of the likelihoods, the present system has the ability to use ST-A, ST-B, or a calculated, unique target skin-type chromaticity cluster 206 indicated as ST-C and that is a combination of ST-A and ST-B in proportions that may also depend on the likelihoods. Once ST-C is established, the position of the initial chromaticity point 208 of the image and mapped in the color space 200 may be moved by a correction to a new chromaticity point 210 on the cluster ST-C 206 in color space 200. Once established, the correction is also used to calculate a new white point that corresponds to the new chromaticity point 210, and that may be used going forward to determine the color of other points in the same image.

Figure 3:
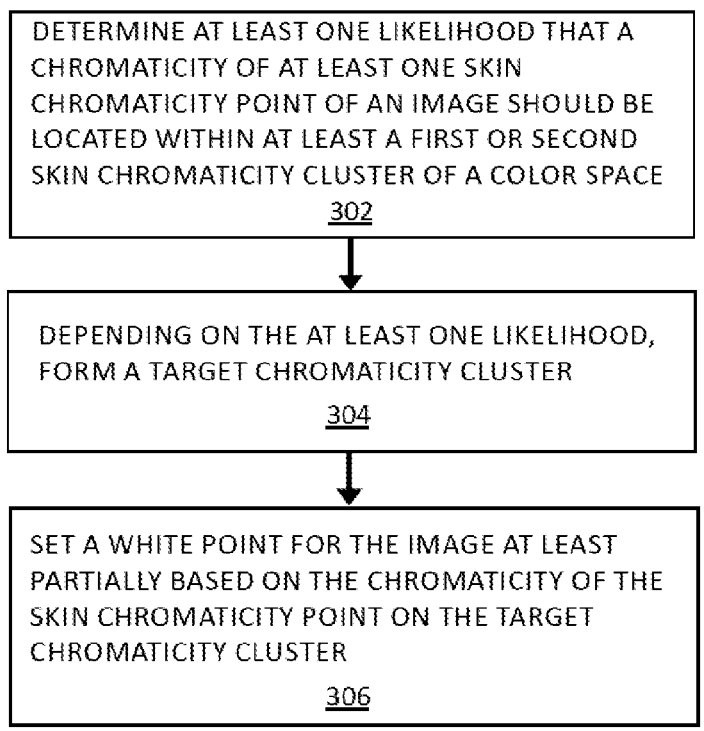
FIG. 3 is a flow chart illustrating an example image processing method.

Referring to FIG. 3, an example process 300 for an image processing system described herein is arranged in accordance with at least some implementations of the present disclosure. In the illustrated implementation, process 300 may include one or more operations, functions or actions as illustrated by one or more of operations 302, 304, and/or 306. By way of non-limiting example, process 300 will be described herein with reference to example image processing system of FIGS. 2 and 4.

Process 300 may be used as a computer-implemented method for automatic white balancing. Process 300 may include "DETERMINE AT LEAST ONE LIKELIHOOD THAT A SKIN CHROMATICITY OF AT LEAST ONE POINT OF AN IMAGE SHOULD BE LOCATED WITHIN A FIRST OR SECOND SKIN CHROMATICITY CLUSTER OF A COLOR SPACE" 302, where at least one likelihood is determined as to whether the chromaticity of a point on an image detected to depict human skin should be located within a first skin chromaticity cluster of a color space or located within a second skin chromaticity cluster of the color space. Thus, for example, this also includes additional likelihoods so that one likelihood may be calculated to correspond to a darker skin type (or simply darker) cluster ST-A, and another likelihood may be calculated to correspond to a lighter skin type (or simply lighter) cluster ST-B. Such multiple likelihoods when used may total up to 100%.

Then, the process 300 may include "DEPENDING ON THE AT LEAST ONE LIKELIHOOD, FORM A TARGET CHROMATICITY CLUSTER" 304, where a target chromaticity cluster may be formed based on at least one of the first and second clusters. In one approach, the target chromaticity cluster is formed from both at least part of the first or darker skin type chromaticity cluster and at least part of the second or lighter skin type chromaticity cluster. This may include forming a target chromaticity cluster ST-C (206 in FIG. 2), for example, when the likelihood is at, above, or below a certain percentage. By one approach, this may occur when neither an ST-A likelihood nor a ST-B likelihood is 100%. In one form, when the likelihood is above 50%, then approximately 100% of the corresponding cluster ST-A or ST-B is used in cluster ST-C. In this case, the other cluster ST-A or ST-B will have a likelihood that is less than 50%. A portion of this other cluster that is proportional to the likelihood is also added to cluster ST-C. For example, if the likelihood of a skin chromaticity point being located within cluster ST-A is 70% and the likelihood of the skin chromaticity point being located in cluster ST-B is 30%, then about 100% of cluster ST-A is used in cluster ST-C, and about 30% of cluster ST-B is used in cluster ST-C. Also in this example form, the 30% portion of ST-B is the portion of ST-B that may be physically, or in other words geometrically on the chromaticity space, closest to cluster ST-A in the chromaticity space 200.

With this configuration, it will be understood that the target cluster ST-C becomes larger as the smaller likelihood approaches 50%. Thus, in one form, when the likelihoods for both ST-A and ST-B are approximately 50%, cluster ST-C is the union of both cluster ST-A and ST-B. Thus, none of the possible chromaticities of ST-A and ST-B are eliminated when the likelihood is 50/50 and the chromaticity of the point may exist equally in either cluster.

Also, the process 300 may include "SET A WHITE POINT FOR THE IMAGE AT LEAST PARTIALLY BASED ON THE SKIN CHROMATICITY OF THE POINT ON THE TARGET CHROMATICITY CLUSTER" 306. By one example, an initial white point is determined, conventional automatic white balancing is applied to calculate RGB gains to adjust the position of a skin chromaticity point to the target chromaticity cluster ST-C. The correction or corrections used to move the skin chromaticity point to the cluster ST-C are then used to modify or recalculate a new white point and new RGB gains. In one form, the skin chromaticity point is moved from its initial location 208 to the closest location 210 on the target cluster ST-C 206 on the color space 200. Alternative ways to move the skin chromaticity point are explained below.

Figure 4:
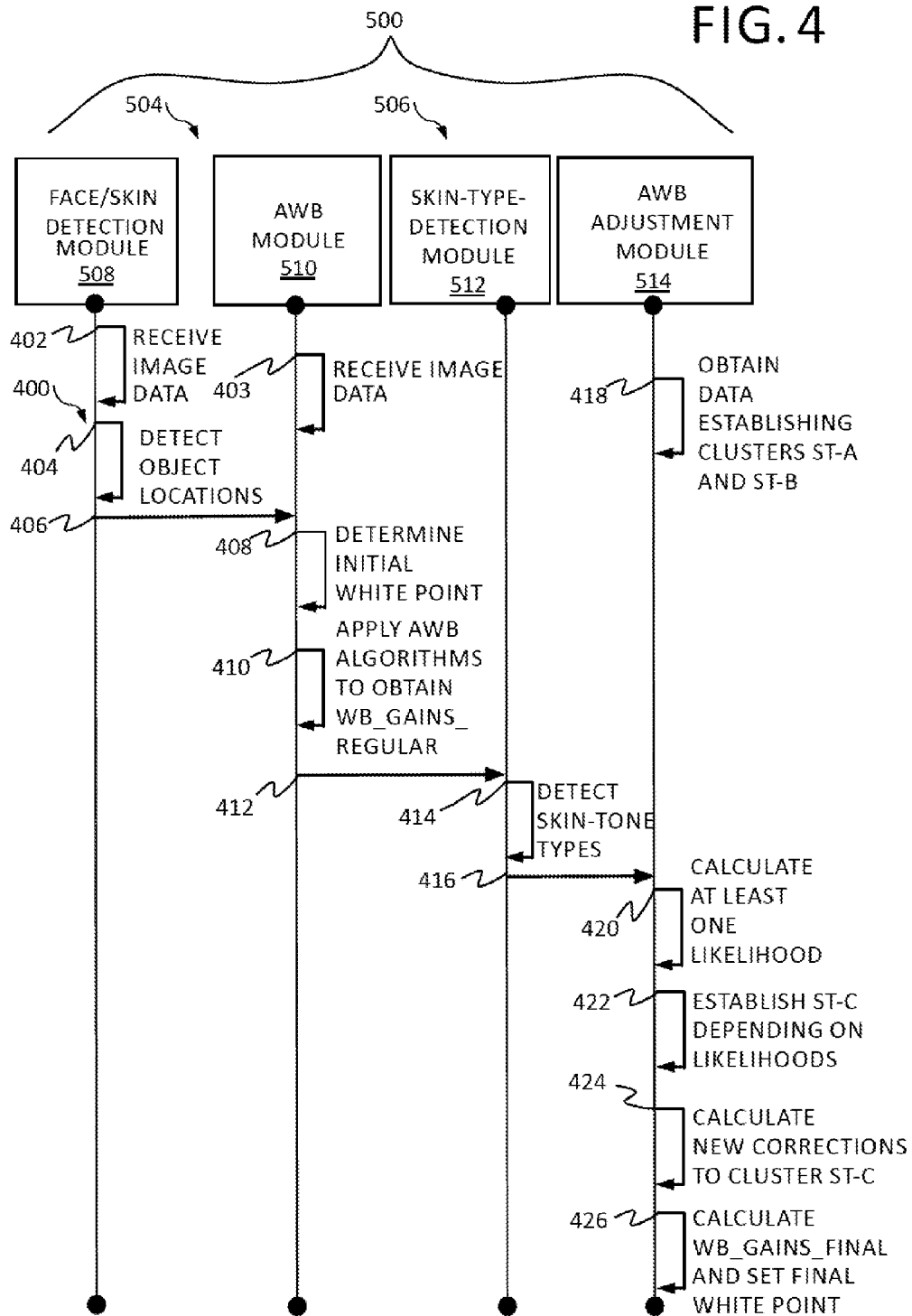
FIG. 4 is an illustrative diagram of an example image processing system in operation.

Referring to FIG. 4, an example image processing system 500 operates automatic white balancing process 400 in accordance with at least some implementations of the present disclosure. In more detail, in the illustrated form, process 400 may include one or more operations, functions or actions as illustrated by one or more of actions 402 to 426 numbered evenly. By way of non-limiting example, process 400 will be described herein with reference to example image processing system 500 of FIG. 5.

In one form, the image processing system 500 may include logic modules 504, the like, and/or combinations thereof. For example, logic modules 504 may include an automatic white balancing control 506 and that may include an AWB module 510, a skin-type detection module 512, and an AWB adjustment module 514. The logic modules 504 also may have a face/skin detection module 508 that may or may not be considered to be included within the automatic white balancing control 506. These logic modules also coordinate with, or are communicatively coupled to, an imaging device 502, processors 520 including an image signal processor (ISP) 522, one or more memories 524, displays 526, encoder 528, and antenna 530 as described below and shown in FIG. 5.

The imaging device 502 provides image data to the logic modules 504, and specifically to the face/skin detection module 508 and the automatic white balancing control 506. The face/skin detection module 508 provides face/skin location data to the skin-type detection module 512, while the AWB module 510 uses the image data to perform regular automatic white balancing and calculate initial or regular gains to be applied to the initial white point. Based on the regular gains and initial white point, the skin-type detection module 512 provides the chromaticity data for the face and skin areas of an image, and provides a skin chromaticity point of the detected object for analysis. The skin chromaticity point may be the average chromaticity of a detected object or some other selected point (such as a geometric center or edge) of the detected object. The AWB adjustment module 514 then uses this data to calculate the likelihoods that the skin chromaticity point is within skin chromaticity clusters ST-A or ST-B as described herein. The AWB adjustment module 514 then may establish skin-chromaticity target cluster ST-C, and move the skin chromaticity point to a final location on target cluster ST-C, where at least one, but here both of these operations depend on the likelihoods. Thereafter, the correction to the final skin chromaticity point on the target cluster ST-C may be used to establish the corrected (or final or new) white point. The new white point may then be used to determine the chromaticity of the face and skin-tone areas on the image as well as all of the other colors in the image.

In more detail, process 400 may be used as a computer-implemented method for automatic white balancing with skin tone correction for image processing. Process 400 may first include "RECEIVE IMAGE DATA" 402 which may include receipt of pre-processed, raw image data as explained below, and the image data may then be used to "DETECT OBJECT LOCATIONS" 404, such as the mapping of human faces and/or human skin areas on the image. This object location information then may be provided to the skin-type detection module 512 and the AWB module 510, and operation 406 then may continue with the AWB module 510. While the operation of FIG. 4 indicates that certain modules may receive data from a different module or other component, it will be understood that this includes one component storing data and making the data available for another component to obtain the data from storage, whether a controller, module, image processing device, or other component.

The AWB module 510 may also separately "RECEIVE IMAGE DATA" 403, or otherwise may have the data provided by, or made accessible by, the face/skin detection module 508. The AWB module 510 also may receive the face detection, object location data. Then, the AWB module 510 uses the image data to "DETERMINE AN INITIAL WHITE POINT" 408 of the image, and then to "APPLY AWB ALGORITHMS TO OBTAIN WB_GAINS_REGULAR" 410, where the AWB algorithms, such as grey world AWB, are described below. The WB_gains_regular are regular, initial, or preliminary gains applied to the initial white point. This may be considered to form a preliminary skin chromaticity point (such as point 208) for a detected skin object or point for processing. As mentioned above, a selected skin chromaticity point is associated with each detected object and may be an average chromaticity of the entire object or of certain areas of the object. Thus, for multiple objects, the initial white point, and regular gains WB_gains_regular are used to calculate the initial chromaticity of the associated skin chromaticity point for each object.

The regular gains are then provided to the AWB adjustment module 514 and the skin-type detection module 512, and operation 412 continues with the skin-type detection module

512. Once the skin-type detection module 512 obtains the face and skin locations, it may "DETECT SKIN-TONE TYPES" 414 by methods that may avoid using the regular gains in order to avoid errors that may be incorporated into the initial chromaticities. Thus, by one approach, skin-tone type detection may proceed by comparing skin areas with other areas of a face such as eyes and teeth, and may compare the skin areas to other areas of the image. Another method may include analyzing the brightness of the skin areas where brighter skin tends to indicate inclusion of the skin chromaticity point in lighter cluster ST-B while darker skin indicates inclusion in darker cluster ST-A. One of these example methods is discussed in more detail below. These comparisons may provide at least part of the basis for correct (or more correct) chromaticity for the skin chromaticity point. These calculated initial chromaticities then may be made available for operation 416 by the AWB adjustment module 514 for calculation of likelihoods also provided in detail below. It will be understood that in some cases, the skin-type detection module 512 or other modules also may perform the likelihood calculations and simply provided the likelihoods to the AWB adjustment module 514. In the illustrated example, this is performed by the AWB adjustment module 514 itself.

The AWB adjustment module 514 may "OBTAIN DATA ESTABLISHING CLUSTERS ST-A AND ST-B" 418, and specifically, the darker chromaticity cluster ST-A and the lighter chromaticity cluster ST-B in chromaticity space that determines the areas in the chromaticity space for the skin chromaticity point depending on the skin tone detected, and as shown in FIG. 2 by one example. Once the AWB adjustment module 514 receives the data for the chromaticity for the detected face and other skin areas of the image, and the regular gains, the AWB adjustment module 514 may "CALCULATE AT LEAST ONE LIKELIHOOD" 420, and in one example, the likelihood that the initial skin chromaticity point 208 should be within ST-A and/or ST-B for example. As explained below and shown on FIG. 8, the AWB adjustment module 514 may then "ESTABLISH ST-C DEPENDING ON THE LIKELIHOODS" 422. In one example form, if the likelihood that the white point is within cluster ST-A or ST-B is about 100%, then the indicated cluster with 100% certainty is used moving forward as cluster ST-C. By one example, approximately the entire cluster is used, and by another example the entire cluster is used, as cluster ST-C. If the likelihood for both clusters ST-A and ST-B is about 50%, then a union of clusters ST-A and ST-B is used as cluster ST-C. Otherwise, when the likelihood of cluster ST-A or ST-B is between about 50% and about 100%, that indicated cluster ST-A or ST-B is used, and in one form approximately the entire (about 100%) of the cluster. In this case, a proportion of the other cluster of ST-A and ST-B with less than a 50% likelihood also is used but only as the proportion of its likelihood. Thus, for example if the likelihoods for clusters ST-A and ST-B is respectively 70% and 30%, then all of ST-A may be used to form cluster ST-C, but only 30% of ST-B may be used in cluster ST-C. Many other combinations are possible.

Once target cluster ST-C is established, the operation "CALCULATE CORRECTIONS TO ST-C" 424 is performed to place the skin chromaticity at a new skin chromaticity point, such as point 210, on target cluster ST-C. By one approach, a correction to cluster ST-C is established for each representative skin chromaticity point resulting in multiple correction gains. These corrections are then combined, or averaged by one example, to obtain a single correction Ctot to the target cluster ST-C for the image.

Next the correction to the target cluster ST-C may be used to "CALCULATE WB_GAINS_FINAL AND SET FINAL WHITE POINT" 426. This may be performed by adjusting the regular gains by the total correction Ctot to establish the final gains for an image. Thereafter, the final gains (WB_GAINS_FINAL) may be used to set the final white point for the image. The new or final white point may then be used to determine the corrected chromaticity for objects such as human faces and skin as well as other pixels in the image.

In addition, any one or more of the operations of FIGS. 3 and 4 may be undertaken in response to instructions provided by one or more computer program products. Such program products may include signal bearing media providing instructions that, when executed by, for example, a processor, may provide the functionality described herein. The computer program products may be provided in any form of computer readable medium. Thus, for example, a processor including one or more processor core(s) may undertake one or more of the operations shown in FIGS. 3 and 4 in response to instructions conveyed to the processor by a computer readable medium. In one form, the computer readable medium is a non-transitory article or medium.

As used in any implementation described herein, the term "module" refers to any combination of software, firmware and/or hardware configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 5:
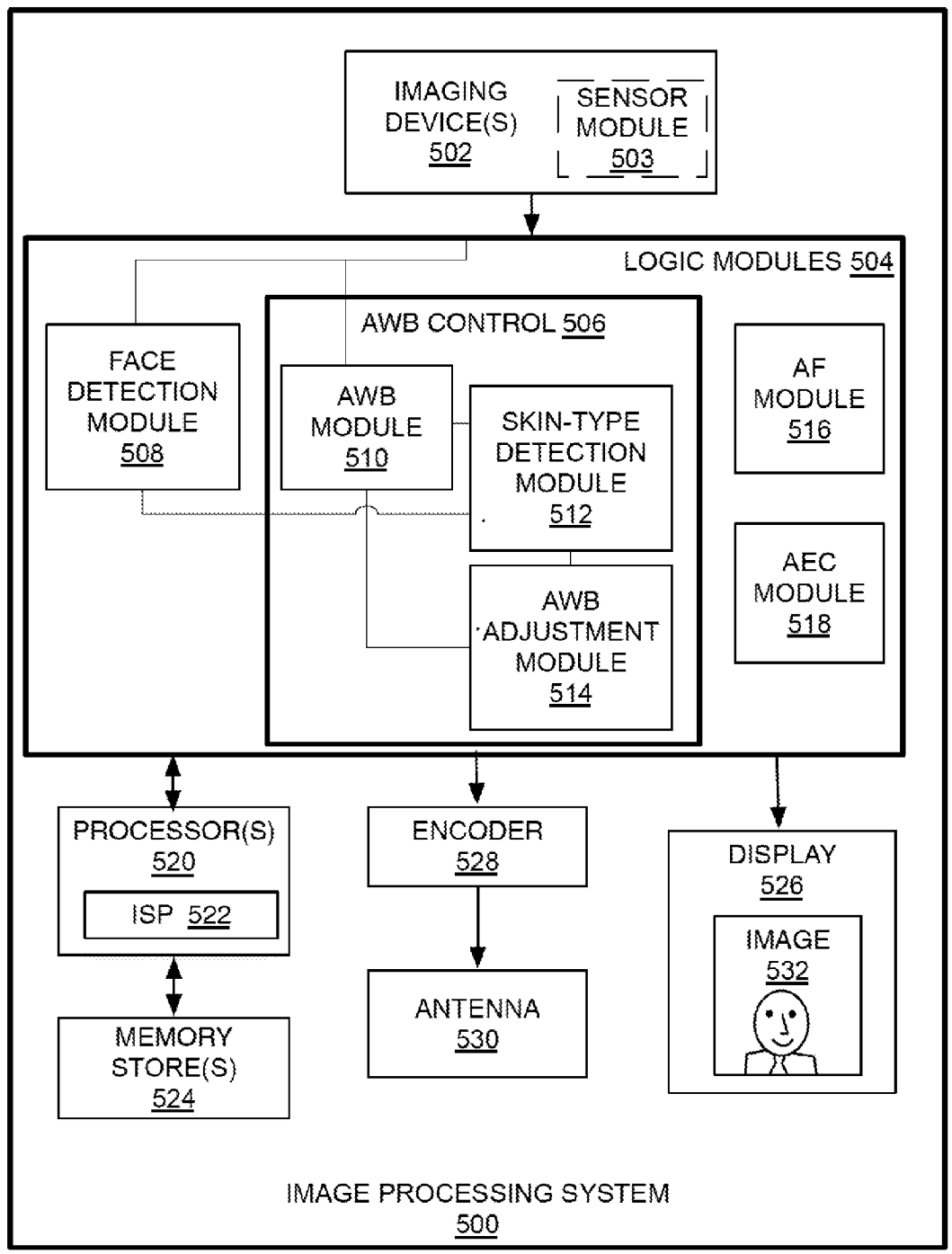
FIG. 5 is an illustrative diagram of an example image processing system.

Referring to FIG. 5, an example image processing system 500 is arranged in accordance with at least some implementations of the present disclosure. In various implementations, the example image processing system 500 may have an imaging device 502 to form or receive captured image data. This can be implemented in various ways. Thus, in one form, the image processing system 500 may be a digital camera or other image capture device, and imaging device 502, in this case, may be the camera hardware and camera sensor software or module 503. In other examples, imaging processing system 500 may have an imaging device 502 that includes or may be a camera, and the logic modules 504 may communicate remotely with, or otherwise may be communicatively coupled to, the imaging device 502 for further processing of the image data.

In either case, such technology may include a camera such as a digital camera system, a dedicated camera device, or an imaging phone, whether a still picture or video camera or some combination of both. Thus, in one form, imaging device 502 may include camera hardware and optics including one or more sensors as well as auto-focus, zoom, aperture, ND-filter, auto-exposure, flash, and actuator controls. These controls may be part of a sensor module 503 for operating the sensor. The sensor module 503 may be part of the imaging device 502, or may be part of the logical modules 504 or both. Such sensor module can be used to generate images for a viewfinder and take still pictures or video. The imaging device 502 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS) or a charge-coupled device-type image sensor (CCD)), without the use of a red-green-blue (RGB) depth camera and/or microphone-array to locate who is speaking. In other examples, an RGB-Depth camera and/or microphone-array might be used in addition to or in the alternative to a camera sensor. In some examples, imaging device 502 may be provided with an eye tracking camera.

In the illustrated example, the logic modules 504 include the automatic white balancing control 506 and the face/skin detection module 508 as well as an automatic focus (AF) module 516 and automatic exposure control (AEC) module 518. The automatic white balancing control 506 and face/skin detection module are communicatively coupled to the imaging device 502 in order to receive the raw image data described below.

By one approach, the automatic white balancing control 506 includes the AWB module 510, the skin-type detection module 512, the AWB adjustment module 514, the like, and/or combinations thereof. By one form, the AWB module 510 also receives the image data from the imaging device 502, and may be communicatively coupled to, and coordinates with, the skin-type detection module 512 and AWB adjustment module 514 as described herein.

Also in the illustrated form, the image processing system 500 may have one or more processors 520 which may include a dedicated image signal processor (ISP) 522 such as the Intel Atom, memory stores 524, one or more displays 526, encoder 528, and antenna 530. In one example implementation, the image processing system 100 may have the display 526, at least one processor 520 communicatively coupled to the display, at least one memory 524 communicatively coupled to the processor, and an automatic white balancing adjustment control communicatively coupled to the processor to adjust the white point of an image so that the colors in the image may be corrected as described herein. The encoder 528 and antenna 530 may be provided to compress the modified image date for transmission to other devices that may display or store the image. It will be understood that the image processing system 500 may also include a decoder (or encoder 528 may include a decoder) to receive and decode image data for processing by the system 500. Otherwise, the processed image 532 may be displayed on display 526 or stored in memory 524. As illustrated, any of these components may be capable of communication with one another and/or communication with portions of logic modules 504 and/or imaging device 502. Thus, processors 520 may be communicatively coupled to both the image device 502 and the logic modules 504 for operating those components. By one approach, Although image processing system 500, as shown in FIG. 5, may include one particular set of blocks or actions associated with particular modules, these blocks or actions may be associated with different modules than the particular module illustrated here.

Figure 6:
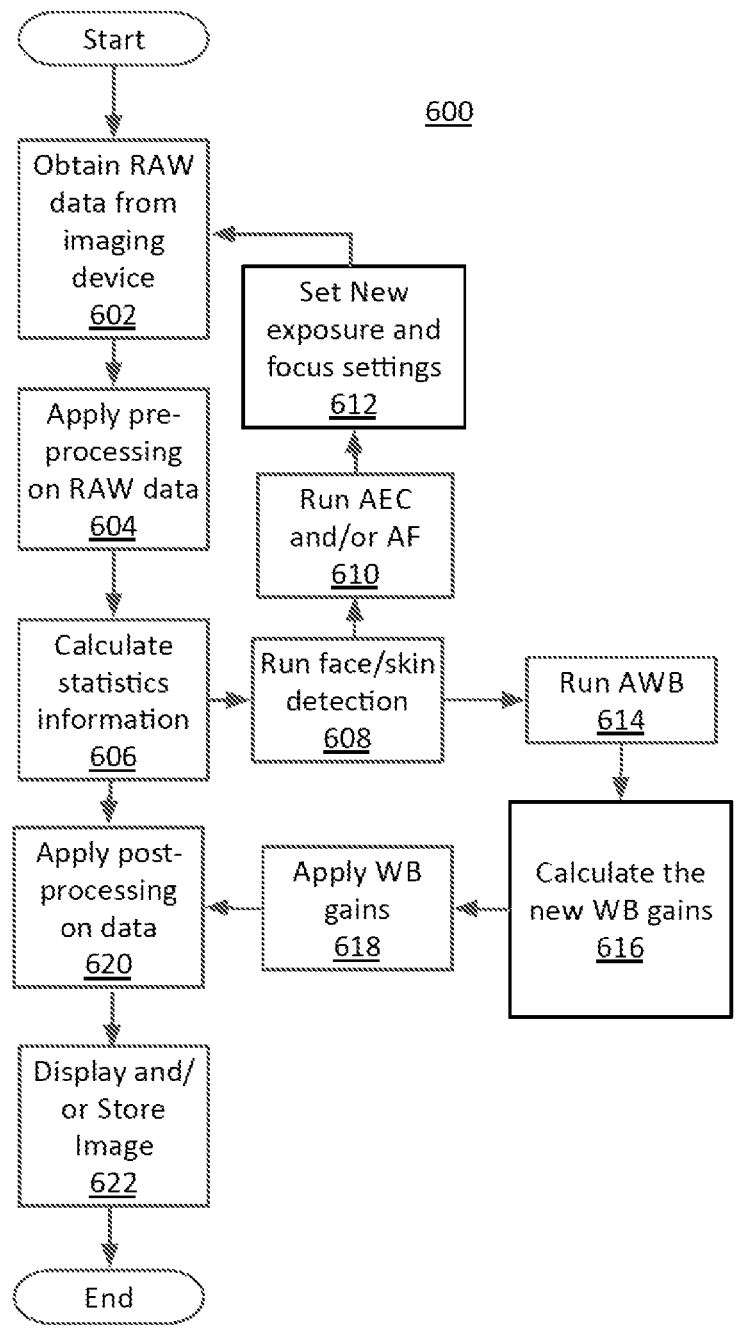
FIG. 6 is a flow chart illustrating an overall, example image processing method.

Referring to FIG. 6, the operation of the image processing system described herein may be placed in context within the overall image process 600. Thus, an example image processing system 500 may operate image process 600 in accordance with at least some implementations of the present disclosure. In more detail, in the illustrated form, process 600 may include one or more operations, functions or actions as illustrated by one or more of actions 602 to 622 numbered evenly. By way of non-limiting example, process 600 will be described herein with reference to example image processing system 500 of FIG. 5 where appropriate.

Thus, as mentioned above and in one example form, raw data from an imaging device may be obtained 602. This raw image data may have a RGB Bayer filter format, where for each 2×2 pixel block, two have Green data, one Red data, and one Blue data. In another form, the color filter may be a CMY Bayer filter. In yet other forms, a Foveon-type sensor may be used that records image signals of different wavelengths in different depths within the silicon.

Pre-processing then may be applied 604 to the raw image data. This may include noise reduction, pixel linearization, and shading compensation. It also may include resolution reduction, Bayer demosaic, and/or vignette elimination. Once pre-processed, statistics information may be calculated 606. This may include luminance/chrominance values and averages, luminance/chrominance high frequency and texture content, motion content from frame to frame, any other color content values, picture statistical data regarding deblocking control (for example, information controlling deblocking/non-deblocking), RGBS grid, filter response grid, and RGB histograms to name a few examples. This information may be provided on a macroblock or coding unit (CU) basis (for example, per 16×16, or 8×8, or other size block of pixels), or may be provided per pixel, or other unit basis as desired depending on compatibility parameters for certain standard coding schemes such as H.264/Advanced Video Coding (AVC) or High Efficiency Video Coding (HEVC) to name a few examples.

By one approach where enhanced image processes are omitted, the image process 600 may continue to post-processing 620 and then display or storage 622 of the image. By the enhanced imaging processes presented herein, however, the process may continue with face/skin type detection 608. In some examples, the detection of the face, or other objects, may include detection based at least in part on a Viola-Jones-type framework (see, e.g., Paul Viola, Michael Jones, Rapid Object Detection using a Boosted Cascade of Simple Features, CVPR 2001 and/or PCT/CN2010/000997, by Yangzhou Du, Qiang Li, entitled TECHNIQUES FOR FACE DETECTION AND TRACKING, filed Dec. 10, 2010). Such facial detection techniques may allow relative accumulations to include face detection, landmark detection, face alignment, smile/blink/gender/age detection, face recognition, detecting two or more faces, and/or the like. Other detection techniques may be used as long as the location of human faces, human skin, and/or other targeted objects in an image can be determined.

The process 600 may also run 610 automatic exposure control (AEC) algorithms and automatic focus (AF) algorithms to then set 612 new settings for illumination exposure and lens focus for the next image captured in an image capturing device or camera, for example. Otherwise, the statistics and face/skin detection data may be used to run 614 automatic white balancing (AWB) as explained herein. The AWB will provide initial or regular white balance gains WB_gains_regular based on an initial white point. The chromaticity clusters as described herein and specifically in the automatic white balancing processes of FIGS. 3-4 and 7-8 are then used to establish a new or final white point and calculate 616 new or final white balance (WB) gains by adjusting the regular gains. The new or final white balance gains are then applied 618 to the pixel, CU, or macroblock data.

The process then proceeds to post-processing 620 of the data. This may include CFA (Color Filter Array) interpolation, color space conversion, (such as raw RGB to sRGB where not performed already, for example), gamma correction, RGB to YUV conversion, image sharpening, and so on. The post processing may be performed by a processor such as the ISP 522 for performing these processes by software and/or the ISP's hardware pipelines.

Next, the processed image may be displayed or stored as described herein. Alternatively, or additionally, the image data may be provided to an encoder for compression and transmission to another display or storage device.

Figure 7:
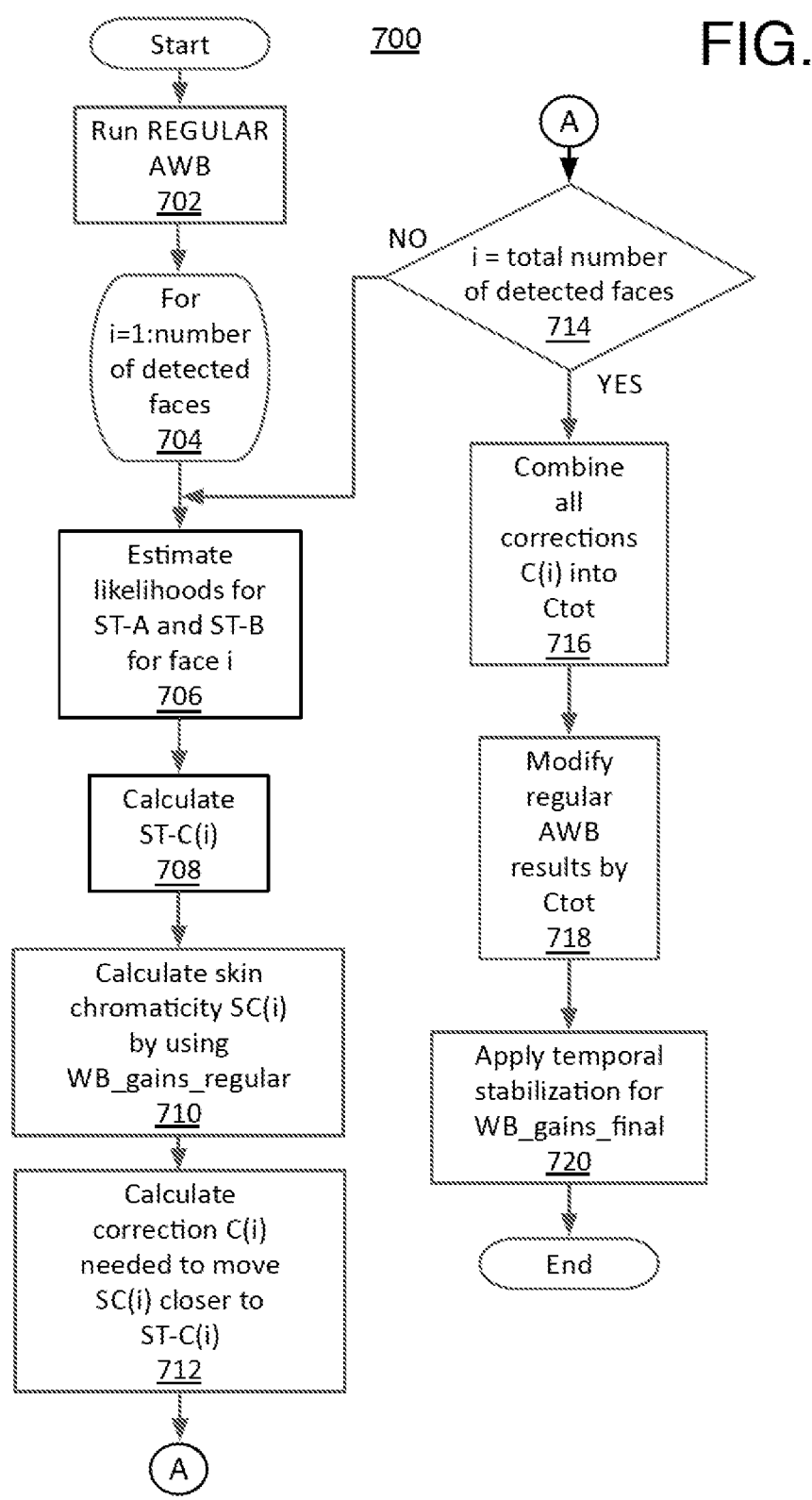
FIG. 7 is a flow chart illustrating a detailed, example automatic white balancing process.

Referring to FIG. 7, one example approach for conducting automatic white balancing according to the processes described herein is illustrated by the AWB process 700, and may be considered as one example approach for operations 614, 616 and 618 of the overall image process 600. Thus, an example image processing system 500 may operate image process 700 in accordance with at least some implementations of the present disclosure. In more detail, in the illustrated form, process 700 may include one or more operations, functions or actions as illustrated by one or more of actions 702 to 720 numbered evenly. By way of non-limiting example, process 700 will be described herein with reference to example image processing system 500 of FIG. 5 where appropriate.

This AWB process may run 702 regular AWB on the captured image data. Other preliminary tasks that may be included in this operation if not performed already is to convert the raw data to RGB(linear), and convert the data into the linear chromaticity space (RIG, BIG) as shown in FIG. 2.

The AWB operation 702 may include performing AWB algorithms such as color correlation, gamut mapping, grey-edge, and/or grey-world AWB methods. For the grey-world method, as an example, the averages for all color components are calculated, and then an appropriate gain is applied for each color component so that the averages become equal to each other. The calculations result in an initial or regular gain WB_gains_regular for the image. The WB_gains_regular may refer to three gains for the primary colors (gain_R, gain_G, gain_B for example). This operation may also establish an initial white point.

At this point, the face detection results are considered so that the skin chromaticity point can be determined and corrections can be calculated for each or multiple detected objects. In order to factor in multiple human faces or other objects in an image, a total count of face detections (or other relevant objects) in an image being analyzed may be determined. Then, a counter may be set 704 at i=1 when the analysis of the first object commences.

Then, the likelihoods that the skin chromaticity point exists in a first or second cluster on a chromaticity space is estimated 706 for the first detected face or object i=1. In the illustrated form, at least one likelihood L-A may be determined for darker cluster ST-A, and another likelihood L-B for lighter cluster ST-B. As explained below with respect to the process 800, the likelihoods for each or multiple clusters may be calculated up front, or the likelihoods may be calculated as needed.

By one implementation, the likelihoods are at least partially based on comparisons between pixels or pixel blocks previously indicated to be part of the skin on a human face or another area of human skin. These features are then compared to the whites of eyes, teeth, and so forth. By another example, these skin features may be compared to other parts of the image as well. The brightness of the chromaticity points on the detected object may also be used to detect skin-tone or skin type. In one example implementation, the likelihoods are calculated by the following formulas, based on a ratio between average luminance of eye-white and skin:

For the likelihood that the chromaticity of the skin chromaticity point should be in darker cluster ST-A (L_A):

$$\text{Ratio} = \frac{\text{avg\_eye\_white\_Y}}{\text{avg\_skin\_Y}} \quad (1)$$

$$\text{if } (\text{Ratio} \leq 0.85)\{L\_A = 0\%\} \quad (2)$$

$$\text{elseif } (0.85 < \text{Ratio} < 0.95)\left\{L\_A = 50\% \cdot \frac{\text{Ratio} - 0.85}{0.95 - 0.85}\right\} \quad (3)$$

$$\text{elseif } (0.95 \leq \text{Ratio} \leq 1.05)\{L\_A = 50\%\} \quad (4)$$

$$\text{elseif } (1.05 < \text{Ratio} < 2.0)\left\{L\_A = 50\% + 50\% \cdot \frac{\text{Ratio} - 1.05}{2.0 - 1.05}\right\} \quad (5)$$

$$\text{elseif } (\text{Ratio} \geq 2.0)\{L\_A = 100\%\} \quad (6)$$

Then, for the likelihood that the chromaticity point should be in lighter cluster ST-B:

$$L\_B = 100\% - L\_A \quad (7)$$

The values avg_eye_white_Y and avg_skin_Y refer to the average luminance level of the eye white of the person detected on the image, and to the average luminance level of the skin of the person on the image, respectively. The values are in linear sRGB color space (not in gamma corrected or otherwise non-linear color space). It should be noted that the actual values of the thresholds are provided only as examples of possible values.

Alternatively, the average of teeth luminance and eye white luminance could be used together instead of only eye white luminance, in order to provide more data in the cases in which eyes are half shut or completely shut. Similarly, also lip luminance could be used, in the case where both eyes and mouth are closed. Temporal information can be utilized so that as long as the eyes of a person have been open at some point during the viewfinding of the digital camera, the eye white luminance information can be used in the classification of the skin type.

Figure 8:
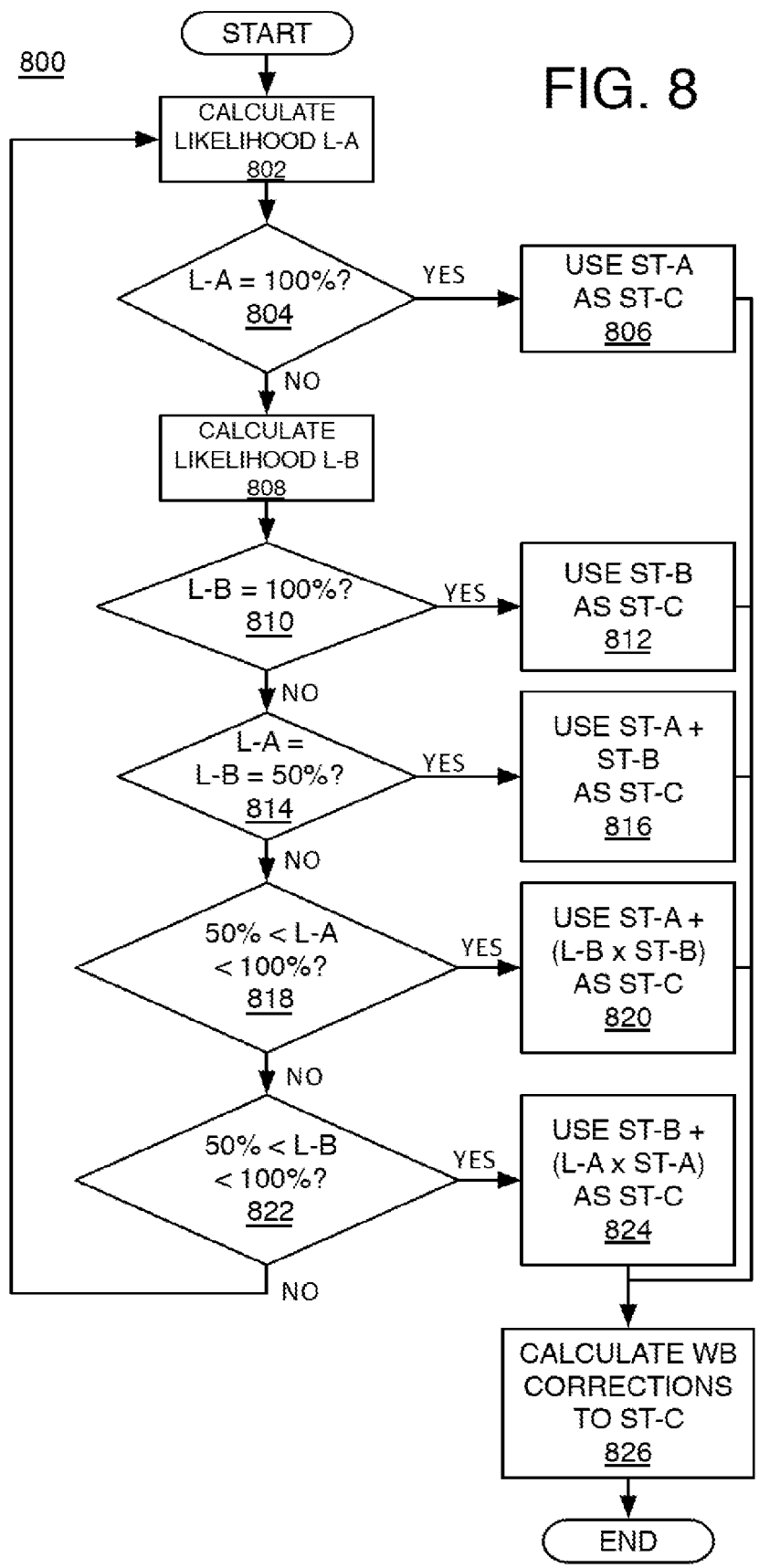
FIG. 8 is a flow chart illustrating an example cluster forming process.

Once the likelihoods are established, target or custom cluster ST-C may be located or calculated 708, and in one example approach, by the manipulation of the likelihoods L-A and L-B for clusters ST-A and ST-B respectively to determine which chromaticities in the color space may be included in cluster ST-C in the process described with FIG. 8. This process may establish a linear transition, scale, or spectrum of likelihoods, and in turn many potential different combinations of ST-A and ST-B, to avoid a hardline or binary transition. This may or may not include a calculation to convert the chromaticities to normalized sRGB color space. This conversion may be performed later for calculations with the preliminary white point SC(i) as mentioned below.

Skin chromaticity SC(i) of the detected face or skin area i, may be calculated 710 at least partially based on the regular gains WB_gains_regular, if not performed already. By one approach, SC(i) may be considered to be the preliminary skin chromaticity point in chromaticity space that is located by using the regular gains. By one approach, the preliminary, regular skin chromaticity point in RGB space (wbdRGB) may be found by:

$$wbdRGB = [wbdR, wbdG, wbdB]^T = [\text{gain\_R} * \text{rawR}, \text{gain\_G} * \text{rawG}, \text{gain\_B} * \text{rawB}]^T \quad (8)$$

where (rawR, rawG, rawB) are the pre-processed raw R, G, and B averages for each pixel, block or other unit being used, (gain_R, gain_G, and gain_B) are the regular gains used as the preliminary adjustment for the skin chromaticity point, and (wbdR, wbdG, and wbdB) are the new white balanced (wbd) skin chromaticity point or points.

Thereafter, a 3×3 color conversion matrix (CCM) may be used to convert the RGB space values to linear sRGB values (or other device independent color space) as follows:

$$ccmRGB = [ccmR, ccmG, ccmB]^T = CCM * wbdRGB \tag{9}$$

The resulting values may be normalized to determine the regular chromaticity for the chromaticity space (as shown in FIG. 2), where:

$$SC(i) = [ccmR/ccmG, ccmB/ccmG] \tag{10}$$

Once the locations of cluster ST-C(i) and the preliminary skin chromaticity point SC(i) are established in the color space, by one option, extra gains (or corrections) are calculated 712 to move the preliminary skin chromaticity point SC(i) to the final skin chromaticity point location SC-F(i) on cluster ST-C(i) for detected object (i). This assumes that the preliminary skin chromaticity point is not found to exist within cluster ST-C in the first place. The correction is represented by a gain vector correction C(i) where:

$$C(i) = [\text{extra\_gain\_R}, \text{extra\_gain\_G}, \text{extra\_gain\_B}]^T \tag{11}$$

where (extra_gain_R, extra_gain_G, extra_gain_B) are the corrections for rawR, rawG, rawB respectively, which in combination with WB_gains_regular (WB_gains(i)=WB_gains_regular*C(i)) would cause SC(i) to move towards ST-C(i). It should be noted that the extra gains are in sensor RGB color space, not in linear sRGB color space in which SC(i) lies. The corrections may be converted to sensor RGB color space from linear sRGB space by:

$$C(i) = \text{inv}(CCM) * Csrgb(i) \tag{12}$$

where the gains that move SC(i) to ST-C are Csrgb(i) in the linear sRGB space, and the corresponding gains in sensor RGB space are C(i).

In one form, the skin chromaticity point may be moved to the closest point on cluster ST-C, being an edge of cluster ST-C. By other forms, the extra gains may merely move the skin chromaticity point closer to cluster ST-C but not on or within cluster ST-C. By other forms, certain chromaticity combinations may be fixed so that the skin chromaticity point is moved toward cluster ST-C horizontally, vertically, or other specified direction in the color space. By yet another example, the final skin chromaticity point may be set at some other defined point relative to the target cluster ST-C such as the centerpoint of cluster ST-C.

Once extra gains are established for the present detected object or face i=1, then it is determined 714 whether another object is within the image that should be analyzed. This may be performed by determining if i equals the total number of such detected objects or faces in the image. If not, i is set to i+1, and the process returns to operation 706 to calculate new likelihoods for the next object or face from the image. This process is repeated until i equals the total number of objects in the image. Then, operation continues with combining 716 all of the corrections C(i) into a total correction Ctot. Ctot may be an average or other combination, whether weighted or not. Then, the regular AWB results are modified 718 by Ctot to determine the final WB gains by:

$$WB\_gains\_final = WB\_gains\_regular * Ctot \tag{13}$$

Once the new white point is established, temporal stabilization may be applied 720. By this approach, facial recognition algorithms may be used such that data from previous, or future, frames where the skin was already established for the same human face, may then be used again or used to adjust the skin tone chromaticity or brightness so that it is consistent with adjacent frames or images within the same scene. Otherwise, face recognition may be used on a larger scale to find the same face throughout multiple frames, multiple scenes, a video, or still picture library file, or other image data unit, the like, and/or combinations thereof, to determine whether the correct color for a certain face was already established and can be reused. Alternatively or additionally, the color for a face may be recalculated on a current image, and may be used to adjust past results on previous images (such as on recent past frames where the face color setting is not reliable yet).

Also, it will be understood that the calculations for setting the gains may also consider R, G, and B offset factors, and/or overall digital gain factors to increase or decrease image brightness and/or contrast in addition to color balance. Additionally, while the AWB process described so far includes the elimination of non-linearities, and operation on pre-processed data in a linear environment, alternatively it may be possible to provide an amount and shape of non-linear correction. This may be applied during post-processing on more finalized image data, and by using the linear gains to obtain a non-linear effect. This may be accomplished by subtracting or adding values associated with non-linear correction to the gains, or by using look up tables to perform a transformation to non-linear data.

Thereafter, the process may proceed to post-processing as described in the overall image process 600. It will be understood that operations and functions as described for the AWB process 700 need not always be performed in the order as shown on FIG. 7, and that other orders are possible.

In addition to modifying the white point by adjusting the white balance with extra gains, alternative ways to adjust the white point exist. One alternative is to modify the diagonal elements in the 3×3 color conversion matrix (CCM).

By yet another alternative, other parameters used by an ISP for example may be modified instead of, or in addition to, using extra gains to adjust the skin chromaticity point, and in turn the white point. A multi-axis color correction module could be used to change hue or saturation of certain hue segments in addition or instead.

Also, as mentioned herein, depending on the possible resolution of the image, more than two clusters may be provided. By one example, it may be possible to provide a cluster for multiple or each skin-tone type as that listed on FIG. 2, such that two to six clusters may be provided. Such processing detail may be very calculation heavy and may be most practical when sufficient resolution is provided to warrant such detail for human skin on the image.

Since this AWB process does not rely solely on the traditional AWB algorithms, the AWB process described herein may be more robust or more accurate when little or no reference white or grey appears in an image, and for example, when the grey-world score is low. This occurs because the present AWB process determines white balance gains based at least in part from detected skin tones and not entirely from blocks analyzed for grey-ness for example. Thus, the AWB will be improved even in extreme color conditions.

Referring to FIG. 8, one example process 800 for establishing target cluster ST-C from clusters ST-A and ST-B as described herein is provided. By one example approach, the likelihood corresponding to one of the clusters ST-A and ST-B may be calculated 802 as described with process 700. Here, the likelihood L-A for cluster ST-A is provided but the likelihood L-B for cluster ST-B may be used first instead, or other likelihood for a single cluster or group of clusters if more than two clusters are being analyzed. In operation 804, if likelihood L-A is equal to, or approximately equal to, 100%, cluster ST-A is used 806 as cluster ST-C, and in one form, no further likelihood calculation may be needed to establish cluster ST-C. In one form, the entire cluster ST-A may be used as cluster ST-C, in other forms, approximately all of cluster ST-A may be used as cluster ST-C. The process may then proceed with calculating 826 white balance (WB) corrections (or extra gains) to cluster ST-C as described above.

If L-A is not approximately equal to 100%, likelihood L-B may be calculated 808. In this case, if L-B is approximately equal to, or equal to, 100% (operation 810), then cluster ST-B is used 812 as cluster ST-C, and the process continues as explained above for cluster ST-A. If L-B also is not approximately 100%, then it is determined 814 whether both L-A and L-B are approximately 50%. If so, the union of clusters ST-A and ST-B is used 816 as cluster ST-C. Again, this may include approximately both of the entire clusters ST-A and ST-B.

When L-A and L-B are not both approximately 50%, and neither is approximately 100%, then in one example form, one whole cluster plus a portion of the other cluster is used as cluster ST-C. Specifically, the process determines 818, 822, whether L-A or L-B is greater than about 50% and less than about 100%, or otherwise greater than 50% and less than 100%. If this is true for L-A, than cluster ST-A is used 820 to form part of cluster ST-C. Also, the proportion of cluster ST-B equal to the likelihood L-B is used in cluster ST-C, and in one form, this is the proportion of cluster ST-B closest to the opposite cluster ST-A. Thus, by one non-limiting example, if L-A is 70% and L-B is 30%, all of cluster ST-A is used and the 30% of cluster ST-B that is closest to cluster ST-A are used in cluster ST-C. In operation 824, the same is true where L-B is greater than about 50% and less than about 100% instead of L-A except resulting in the opposite configuration. The process then proceeds as explained above to calculate the final WB gains and the final white point.

It will be understood that many other alternatives are possible. For example, target cluster ST-C may be formed from both clusters ST-A and ST-B, and both in proportions corresponding to their respective likelihoods L-A and L-B. By another example, when more than two clusters are provided, such as by providing a cluster for each skin-tone type, each or multiple clusters may contribute to cluster ST-C each in a proportion corresponding to its likelihood.

Figure 9:
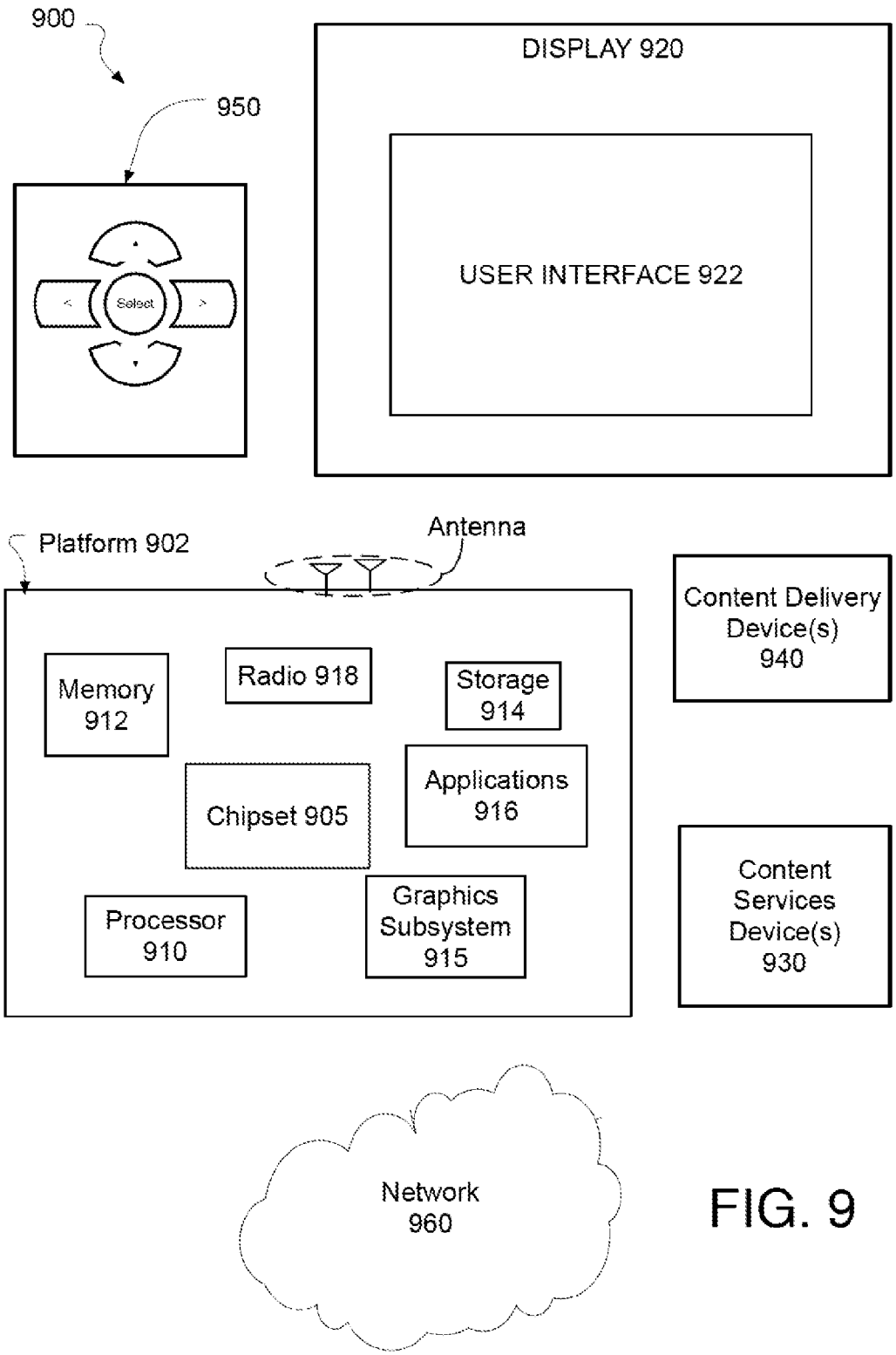
FIG. 9 is an illustrative diagram of an example system.

Referring to FIG. 9, an example system 900 in accordance with the present disclosure operates one or more aspects of the image processing system described herein. It will be understood from the nature of the system components described below that such components may be associated with, or used to operate, certain part or parts of the image processing system described above. In various implementations, system 900 may be a media system although system 900 is not limited to this context. For example, system 900 may be incorporated into a digital still camera, digital video camera, mobile device with camera or video functions such as an imaging phone, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 900 includes a platform 902 coupled to a display 920. Platform 902 may receive content from a content device such as content services device(s) 930 or content delivery device(s) 940 or other similar content sources. A navigation controller 950 including one or more navigation features may be used to interact with, for example, platform 902 and/or display 920. Each of these components is described in greater detail below.

In various implementations, platform 902 may include any combination of a chipset 905, processor 910, memory 912, storage 914, graphics subsystem 915, applications 916 and or radio 918. Chipset 905 may provide intercommunication among processor 910, memory 912, storage 914, graphics subsystem 915, applications 916 and/or radio 918. For example, chipset 905 may include a storage adapter (not depicted) capable of providing intercommunication with storage 914.

Processor 910 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 910 may be dual-core processor(s), dual-core mobile processor(s), and so forth.

Memory 912 may be implemented as a volatile memory device such as, but not limited to, a Random Access Memory (RAM), Dynamic Random Access Memory (DRAM), or Static RAM (SRAM).

Storage 914 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 914 may include technology to increase the storage performance enhanced protection for valuable digital media when multiple hard drives are included, for example.

Graphics subsystem 915 may perform processing of images such as still or video for display. Graphics subsystem 915 may be a graphics processing unit (GPU) or a visual processing unit (VPU), for example. An analog or digital interface may be used to communicatively couple graphics subsystem 915 and display 920. For example, the interface may be any of a High-Definition Multimedia Interface, Display Port, wireless HDMI, and/or wireless HD compliant techniques. Graphics subsystem 915 may be integrated into processor 910 or chipset 905. In some implementations, graphics subsystem 915 may be a stand-alone card communicatively coupled to chipset 905.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 918 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 818 may operate in accordance with one or more applicable standards in any version.

In various implementations, display 920 may include any television type monitor or display. Display 920 may include, for example, a computer display screen, touch screen display, video monitor, television-like device, and/or a television. Display 920 may be digital and/or analog. In various implementations, display 920 may be a holographic display. Also, display 920 may be a transparent surface that may receive a visual projection. Such projections may convey various forms of information, images, and/or objects. For example, such projections may be a visual overlay for a mobile augmented reality (MAR) application. Under the control of one or more software applications 916, platform 902 may display user interface 922 on display 920.

In various implementations, content services device(s) 930 may be hosted by any national, international and/or independent service and thus accessible to platform 902 via the Internet, for example. Content services device(s) 930 may be coupled to platform 902 and/or to display 920. Platform 902 and/or content services device(s) 930 may be coupled to a network 960 to communicate (e.g., send and/or receive) media information to and from network 960. Content delivery device(s) 940 also may be coupled to platform 902 and/or to display 920.

In various implementations, content services device(s) 930 may include a cable television box, personal computer, network, telephone, Internet enabled devices or appliance capable of delivering digital information and/or content, and any other similar device capable of unidirectionally or bidirectionally communicating content between content providers and platform 902 and/display 920, via network 960 or directly. It will be appreciated that the content may be communicated unidirectionally and/or bidirectionally to and from any one of the components in system 900 and a content provider via network 960. Examples of content may include any media information including, for example, video, music, medical and gaming information, and so forth.

Content services device(s) 930 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 902 may receive control signals from navigation controller 950 having one or more navigation features. The navigation features of controller 950 may be used to interact with user interface 922, for example. In embodiments, navigation controller 950 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 950 may be replicated on a display (e.g., display 920) by movements of a pointer, cursor, focus ring, or other visual indicators displayed on the display. For example, under the control of software applications 916, the navigation features located on navigation controller 950 may be mapped to virtual navigation features displayed on user interface 922, for example. In embodiments, controller 950 may not be a separate component but may be integrated into platform 902 and/or display 920. The present disclosure, however, is not limited to the elements or in the context shown or described herein.

In various implementations, drivers (not shown) may include technology to enable users to instantly turn on and off platform 902 like a television with the touch of a button after initial boot-up, when enabled, for example. Program logic may allow platform 902 to stream content to media adaptors or other content services device(s) 930 or content delivery device(s) 940 even when the platform is turned "off." In addition, chipset 905 may include hardware and/or software support for 8.1 surround sound audio and/or high definition (7.1) surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 900 may be integrated. For example, platform 902 and content services device(s) 930 may be integrated, or platform 902 and content delivery device(s) 940 may be integrated, or platform 902, content services device(s) 930, and content delivery device(s) 940 may be integrated, for example. In various embodiments, platform 902 and display 920 may be an integrated unit. Display 920 and content service device(s) 930 may be integrated, or display 920 and content delivery device(s) 940 may be integrated, for example. These examples are not meant to limit the present disclosure.

In various embodiments, system 900 may be implemented as a wireless system, a wired system, or a combination of both. When implemented as a wireless system, system 900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 902 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 9.

Figure 10:
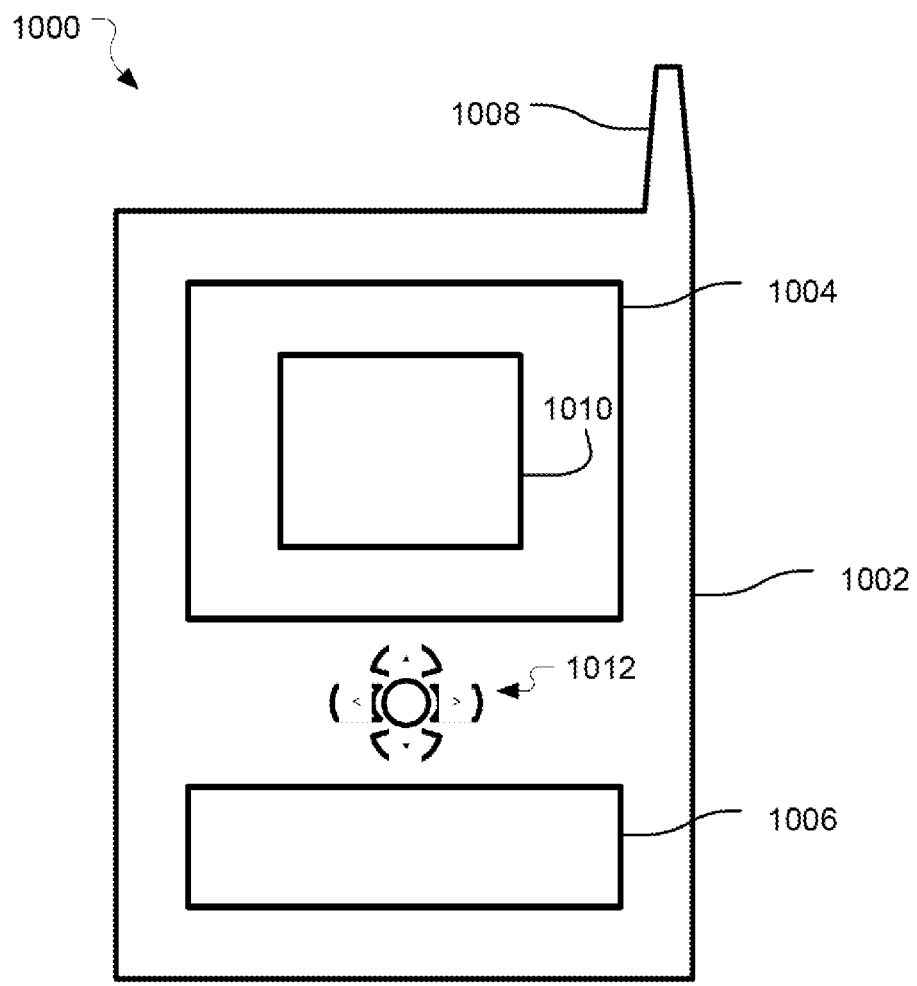
FIG. 10 is an illustrative diagram of an example system, all arranged in accordance with at least some implementations of the present disclosure.

Referring to FIG. 10, a small form factor device 1000 is one example of the varying physical styles or form factors in which system 900 may be embodied. By this approach, device 1000 may be implemented as a mobile computing device having wireless capabilities. A mobile computing device may refer to any device having a processing system and a mobile power source or supply, such as one or more batteries, for example.

As described above, examples of a mobile computing device may include a digital still camera, digital video camera, mobile devices with camera or video functions such as imaging phones, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 10, device 1000 may include a housing 1002, a display 1004 including a screen 1010, an input/output (I/O) device 1006, and an antenna 1008. Device 1000 also may include navigation features 1012. Display 1004 may include any suitable display unit for displaying information appropriate for a mobile computing device. I/O device 1006 may include any suitable I/O device for entering information into a mobile computing device. Examples for I/O device 1006 may include an alphanumeric keyboard, a numeric keypad, a touch pad, input keys, buttons, switches, rocker switches, microphones, speakers, voice recognition device and software, and so forth. Information also may be entered into device 1000 by way of microphone (not shown). Such information may be digitized by a voice recognition device (not shown). The embodiments are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

A computer-implemented method of automatic white balancing comprises determining, by an image processing device, at least one likelihood that a skin chromaticity of at least one point on an image should be located within at least a first skin chromaticity cluster of a color space or a second skin chromaticity cluster of the color space. Depending on the at least one likelihood, a target chromaticity cluster may be formed from both at least part of the first skin chromaticity cluster and at least part of the second skin chromaticity cluster. A white point for the image may be set at least partially based on the skin chromaticity of the point on the target chromaticity cluster.

By other implementations, at least two likelihoods may be calculated comprising one likelihood corresponding to a darker skin type and another likelihood corresponding to a lighter skin type. The method also may include forming a target chromaticity cluster that comprises using a portion of the first or second skin chromaticity cluster where the portion is proportional to the at least one likelihood. The portion may be proportional to a corresponding likelihood when the likelihood is less than about 50%. Additionally, the portion may be geometrically or physically closest within the cluster and to the other of the first and second skin chromaticity cluster on the color space. Otherwise, the method may comprise using approximately 100% of the first or second skin chromaticity cluster when a corresponding likelihood is over about 50%.

In one form, a target chromaticity cluster may be formed by (1) establishing the target chromaticity cluster as approximately equal to the first skin chromaticity cluster when a corresponding likelihood is approximately 100%, (2) establishing the target chromaticity cluster as approximately equal to the second skin chromaticity cluster when a corresponding likelihood is approximately 100%, (3) establishing the target chromaticity cluster as approximately the union of the first and second skin chromaticity clusters when both of their respective likelihoods are approximately 50%, (4) establishing the target chromaticity cluster as the first skin chromaticity cluster plus a proportion of the second skin chromaticity cluster when the likelihood corresponding to the first skin chromaticity cluster is more than about 50%, and where the proportion corresponds to a likelihood of the skin chromaticity point being found within the second skin chromaticity cluster, and (5) establishing the target chromaticity cluster as the second skin chromaticity cluster plus a proportion of the first skin chromaticity cluster when the likelihood corresponding to the second skin chromaticity cluster is more than about 50%, and where the proportion corresponds to a likelihood of the skin chromaticity point being found in the first skin chromaticity cluster.

In yet other implementations, the clusters may include two to six skin chromaticity clusters. Also, the likelihoods may be determined by one of: using human eye luminance and skin luminance of a detected face, and using human eye luminance, lip luminance, and skin luminance of a detected face. The method may also comprise establishing an initial location of the skin chromaticity point on the color space, and determining a chromaticity of the skin chromaticity point by applying a correction to the skin chromaticity point to move the skin chromaticity point to at least one of: toward the target chromaticity cluster, to the edge of the target chromaticity cluster, and to the closest point on the target chromaticity cluster. The method may also comprise determining at least one correction gain for each detected skin-providing object of a plurality of skin providing objects detected on the image, and using the correction gains to determine a final white point.

By yet another implementation, a system for image processing with automatic white balancing comprises a display, at least one processor communicatively coupled to the display, at least one memory communicatively coupled to at least one processor, and an automatic white balancing adjustment module communicatively coupled to the processor. The module is configured to determine at least one likelihood that a skin chromaticity of at least one skin chromaticity point on an image should be located within at least a first skin chromaticity cluster of a color space or a second skin chromaticity cluster of the color space. The module also, depending on the at least one likelihood, forms a target chromaticity cluster from both at least part of the first skin chromaticity cluster and at least part of the second skin chromaticity cluster. The module may also set a white point for the image at least partially based on the skin chromaticity of the point on the target chromaticity cluster.

In yet more implementations, the automatic white balancing adjustment module is configured to calculate at least two likelihoods comprising one likelihood corresponding to a darker skin type another likelihood corresponding to a lighter skin type. The target chromaticity cluster may comprise a portion of the first or second skin chromaticity cluster where the portion is proportional to the at least one likelihood. The target chromaticity cluster may also comprise a portion of the first or second skin chromaticity cluster that is proportional to a corresponding likelihood when the likelihood is less than about 50%. Otherwise, the target chromaticity cluster may comprise a portion of the first or second skin chromaticity cluster that is proportional to the at least one likelihood, where the portion of the cluster is geometrically closest within the cluster and to the other of the first and second skin chromaticity cluster on the color space. The target chromaticity cluster may comprise approximately 100% of the first or second skin chromaticity cluster when a corresponding likelihood is over about 50%.

By one form, the target chromaticity cluster may be approximately equal to: (1) the first skin chromaticity cluster when a corresponding likelihood is approximately 100%, (2) the second skin chromaticity cluster when a corresponding likelihood is approximately 100%, (3) the union of the first and second skin chromaticity clusters when both of their respective likelihoods are approximately 50%, (4) the first skin chromaticity cluster plus a proportion of the second skin chromaticity cluster when the likelihood corresponding to the first skin chromaticity color is more than about 50%, and where the proportion corresponds to a likelihood of the skin chromaticity point being found within the second skin chromaticity cluster, and (5) the second skin chromaticity cluster plus a proportion of the first skin chromaticity cluster when the likelihood corresponding to the second skin chromaticity cluster is more than about 50%, and where the proportion corresponds to a likelihood of the skin chromaticity point being found in the first skin chromaticity cluster.

By other alternatives, the clusters may include two to six skin chromaticity clusters. Also, the likelihoods may be determined by one of: using human eye luminance and skin luminance of a detected face, and using human eye luminance, lip luminance, and skin luminance of a detected face. Also, the automatic white balancing adjustment module may be configured to establish an initial location of the skin chromaticity point on the color space, and determine a chromaticity of the skin chromaticity point by applying a correction to the skin chromaticity point to move the skin chromaticity point on the color space to at least one of: toward the target chromaticity cluster, to the edge of the target chromaticity cluster, and to the closest point on the target chromaticity cluster. The automatic white balancing module also may be configured to determine at least one correction gain for each detected skin-providing object of a plurality of skin-providing objects on the image, and using at least the correction gains to determine a final white point for the image.

For other implementations, at least one non-transitory article for automatic white balancing has stored therein a computer program having instructions that when executed, cause the computer to determine, by an image processing device, at least one likelihood that a skin chromaticity of at least one skin chromaticity point on an image should be located within at least a first skin chromaticity cluster of a color space or a second skin chromaticity cluster of the color space. The instructions also cause the computer to, depending on the at least one likelihood, form a target chromaticity cluster from both at least part of the first skin chromaticity cluster and at least part of the second skin chromaticity cluster, and set a white point for the image at least partially based on the skin chromaticity of the point on the target chromaticity cluster.

In yet other alternatives, the instructions cause the computer to calculate at least two likelihoods comprising one likelihood corresponding to a darker skin type and another likelihood corresponding to a lighter skin type. The instructions may also include forming a target chromaticity cluster that comprises using a portion of the first or second skin chromaticity cluster where the portion is proportional to the at least one likelihood. The proportion may be proportional to a corresponding likelihood when the likelihood is less than about 50%. Additionally, the portion may be geometrically closest within the cluster and to the other of the first and second skin chromaticity cluster on the color space. Otherwise, the instructions when executed may cause the computer to use approximately 100% of the first or second skin chromaticity cluster when a corresponding likelihood is over about 50%.

In one form, the instructions may cause a target chromaticity cluster to be formed by (1) establishing the target chromaticity cluster as approximately equal to the first skin chromaticity cluster when a corresponding likelihood is approximately 100%, (2) establishing the target chromaticity cluster as approximately equal to the second skin chromaticity cluster when a corresponding likelihood is approximately 100%, (3) establishing the target chromaticity cluster as approximately the union of the first and second skin chromaticity clusters when both of their respective likelihoods are approximately 50%, (4) establishing the target chromaticity cluster as the first skin chromaticity cluster plus a proportion of the second skin chromaticity cluster when the likelihood corresponding to the first skin chromaticity color is more than about 50%, and where the proportion corresponds to a likelihood of the skin chromaticity point being found within the second skin chromaticity cluster, and (5) establishing the target chromaticity cluster as the second skin chromaticity cluster plus a proportion of the first skin chromaticity cluster when the likelihood corresponding to the second skin chromaticity cluster is more than about 50%, and where the proportion corresponds to a likelihood of the skin chromaticity point being found in the first skin chromaticity cluster.

In yet other implementations, the clusters may include two to six skin chromaticity clusters. Also, the likelihoods may be determined by one of: using human eye luminance and skin luminance of a detected face, and using human eye luminance, lip luminance, and skin luminance of a detected face. The instructions may also cause the computer to establish an initial location of the skin chromaticity point on the color space, and determine a chromaticity of the skin chromaticity point by applying a correction to the skin chromaticity point to move the skin chromaticity point on the color space to at least one of: toward the target chromaticity cluster, to the edge of the target chromaticity cluster, and to the closest point on the target chromaticity cluster. The instructions may also cause the computer to determine at least one correction gain for each detected skin-providing object of a plurality of skin-providing objects on the image, and use at least the correction gains to determine a final white point for the image.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of automatic white balancing, comprising:
    determining, by an image processing device, at least one likelihood that a skin chromaticity of at least one skin chromaticity point on an image should be located within at least a first skin chromaticity cluster of a color space or a second skin chromaticity cluster of the color space;
    depending on the at least one likelihood, forming a target chromaticity cluster of both at least part of the first skin chromaticity cluster and part of the second skin chromaticity cluster that is less than the entire second skin chromaticity cluster; and
    setting a white point for the image at least partially based on the skin chromaticity of the point on the target chromaticity cluster.

2. The method of claim 1 wherein at least two likelihoods are calculated comprising one likelihood corresponding to a darker skin type and another likelihood corresponding to a lighter skin type.

3. The method of claim 1 wherein forming a target chromaticity cluster comprises using a portion of the first or second skin chromaticity cluster wherein the portion is proportional to the at least one likelihood.

4. The method of claim 1 wherein forming a target chromaticity cluster comprises using a portion of the first or second skin chromaticity cluster that is proportional to a corresponding likelihood when the likelihood is less than about 50%.

5. The method of claim 1 wherein forming a target chromaticity cluster comprises using a portion of the first or second skin chromaticity cluster that is proportional to the at least one likelihood, wherein the portion of the cluster is geometrically closest within the cluster and to the other of the first and second skin chromaticity cluster on the color space.

6. The method of claim 1 comprising using approximately 100% of the first or second skin chromaticity cluster when a corresponding likelihood is over about 50%.

7. The method of claim 1 wherein forming a target chromaticity cluster comprises:
    establishing the target chromaticity cluster as approximately equal to the first skin chromaticity cluster when a corresponding likelihood is approximately 100%,
    establishing the target chromaticity cluster as approximately equal to the second skin chromaticity cluster when a corresponding likelihood is approximately 100%,
    establishing the target chromaticity cluster as approximately the union of the first and second chromaticity clusters when both of their respective likelihoods are approximately 50%,
    establishing the target chromaticity cluster as the first skin chromaticity cluster plus a proportion of the second skin chromaticity cluster when the likelihood corresponding to the first skin chromaticity color is more than about 50%, and wherein the proportion corresponds to a likelihood of the chromaticity of the skin chromaticity point being found within the second skin chromaticity cluster, and
    establishing the target chromaticity cluster as the second skin chromaticity cluster plus a proportion of the first skin chromaticity cluster when the likelihood corresponding to the second skin chromaticity cluster is more than about 50%, and wherein the proportion corresponds to a likelihood of the chromaticity of the skin chromaticity point being found in the first skin chromaticity cluster.

8. The method according to claim 1 wherein there is two to six skin chromaticity clusters.

9. The method according to claim 1 wherein the likelihoods are determined by using human eye luminance and skin luminance of a detected face.

10. The method according to claim 1 wherein the likelihoods are determined by using human eye luminance, lip luminance, and skin luminance of a detected face.

11. The method of claim 1 comprising establishing an initial location of the skin chromaticity point on the color space, and determining a chromaticity of the skin chromaticity point by applying a correction to the skin chromaticity point to move the skin chromaticity point on the color space to at least one of:
    toward the target chromaticity cluster,
    to the edge of the target chromaticity cluster, and
    to the closest point on the target chromaticity cluster.

12. The method of claim 1 comprising determining at least one correction gain for each detected skin-providing object of a plurality of detected skin providing objects on the image, and using at least the correction gains to determine a final white point for the image.

13. The method of claim 1, wherein at least two likelihoods are calculated comprising one likelihood corresponding to a darker skin type and another likelihood corresponding to a lighter skin type;

wherein forming a target chromaticity cluster comprises using a portion of the first or second skin chromaticity cluster wherein the portion is proportional to the at least one likelihood;

wherein the portion is proportional to a corresponding likelihood when the likelihood is less than about 50%;

wherein the portion is geometrically closest within the cluster and to the other of the first and second skin chromaticity cluster on the color space;

comprising using approximately 100% of the first or second skin chromaticity cluster when a corresponding likelihood is over about 50%;

wherein forming a target chromaticity cluster comprises:
establishing the target chromaticity cluster as approximately equal to the first skin chromaticity cluster when a corresponding likelihood is approximately 100%,
establishing the target chromaticity cluster as approximately equal to the second skin chromaticity cluster when a corresponding likelihood is approximately 100%,
establishing the target chromaticity cluster as approximately the union of the first and second skin chromaticity clusters when both of their respective likelihoods are approximately 50%,
establishing the target chromaticity cluster as the first skin chromaticity cluster plus a proportion of the second skin chromaticity cluster when the likelihood corresponding to the first skin chromaticity cluster is more than about 50%, and wherein the proportion corresponds to a likelihood of the point being found within the second skin chromaticity cluster, and
establishing the target chromaticity cluster as the second skin chromaticity cluster plus a proportion of the first skin chromaticity cluster when the likelihood corresponding to the second skin chromaticity cluster is more than about 50%, and wherein the proportion corresponds to a likelihood of the point being found in the first skin chromaticity cluster;

wherein there is two to six skin chromaticity clusters;

wherein the likelihoods are determined by one of:
using human eye luminance and skin luminance of a detected face, and
using human eye luminance, lip luminance, and skin luminance of a detected face; and comprising establishing an initial location of the skin chromaticity point on the color space, and determining a chromaticity of the skin chromaticity point by applying a correction to the skin chromaticity point to move the skin chromaticity point on the color space to at least one of:
toward the target chromaticity cluster,
to the edge of the target chromaticity cluster, and
to the closest point on the target chromaticity cluster; and comprising determining at least one correction gain for each detected skin providing object of a plurality of skin-providing objects on the image, and using at least the correction gains to determine a final white point for the image.

14. A system for image processing with automatic white balancing, comprising:
a display;
at least one processor communicatively coupled to the display;
at least one memory communicatively coupled to at least one processor; and
an automatic white balancing adjustment module communicatively coupled to the processor, and being configured to:
determine at least one likelihood that a skin chromaticity of at least one skin chromaticity point on an image should be located within at least a first skin chromaticity cluster of a color space or a second skin chromaticity cluster of the color space;
depending on the at least one likelihood, providing the alternatives to form a target chromaticity cluster of:
(1) both at least part of the first skin chromaticity cluster and at least part of the second skin chromaticity cluster,
(2) substantially one of the first or second skin chromaticity clusters, and
(3) a union of both first and second skin chromaticity clusters; and
set a white point for the image at least partially based on the skin chromaticity of the point on the target chromaticity cluster;
wherein the target chromaticity cluster is approximately equal to:
the first skin chromaticity cluster when a corresponding likelihood is approximately 100%,
the second skin chromaticity cluster when a corresponding likelihood is approximately 100%,
the union of the first and second skin chromaticity clusters when both of their respective likelihoods are approximately 50%,
the first skin chromaticity cluster plus a proportion of the second skin chromaticity cluster when the likelihood corresponding to the first skin chromaticity color is more than about 50%, and wherein the proportion corresponds to a likelihood of the skin chromaticity point being found within the second skin chromaticity cluster, and the second skin chromaticity cluster plus a proportion of the first skin chromaticity cluster when the likelihood corresponding to the second skin chromaticity cluster is more than about 50%, and wherein the proportion corresponds to a likelihood of the skin chromaticity point being found in the first skin chromaticity cluster.

15. The system of claim 14 wherein the automatic white balancing adjustment module is configured to calculate at least two likelihoods comprising one likelihood corresponding to a darker skin type and another likelihood corresponding to a lighter skin type.

16. The system of claim 14 wherein the target chromaticity cluster comprises a portion of the first or second skin chromaticity cluster wherein the portion is proportional to the at least one likelihood.

17. The system of claim 14,
wherein the automatic white balancing adjustment module is configured to calculate at least two likelihoods comprising one likelihood corresponding to a darker skin type and another likelihood corresponding to a lighter skin type;
wherein the target chromaticity cluster comprises a portion of the first or second skin chromaticity cluster wherein the portion is proportional to the at least one likelihood;
wherein the target chromaticity cluster comprises a portion of the first or second skin chromaticity cluster that is proportional to a corresponding likelihood when the likelihood is less than about 50%;
wherein the target chromaticity cluster comprises a portion of the first or second skin chromaticity cluster that is proportional to the at least one likelihood, wherein the portion of the cluster is physically closest within the cluster and to the other of the first and second skin chromaticity cluster on the color space;

wherein the target chromaticity cluster comprises approximately 100% of the first or second skin chromaticity cluster when a corresponding likelihood is over about 50%;

wherein there is two to six skin chromaticity clusters;

wherein the likelihoods are determined by one of:
  using human eye luminance and skin luminance of a detected face, and
  using human eye luminance, lip luminance, and skin luminance of a detected face; and wherein the automatic white balancing adjustment module is configured to establish an initial location of the skin chromaticity point on the color space, and determine a chromaticity of the skin chromaticity point by applying a correction to the skin chromaticity point to move the skin chromaticity point on the color space to at least one of:
toward the target chromaticity cluster,
to the edge of the target chromaticity cluster, and
to the closest point on the target chromaticity cluster; and wherein the automatic white balancing adjustment module is configured to determine at least one correction gain for each detected skin-providing object of a plurality of skin-providing objects on the image, and using at least the correction gains to determine a final white point for the image.

18. At least one non-transitory article for automatic white balancing having stored therein a computer program having instructions that when executed, cause the computer to:
  determine, by an image processing device, at least one likelihood that a skin chromaticity of at least one skin chromaticity point on an image should be located within at least a first skin chromaticity cluster of a color space or a second skin chromaticity cluster of the color space;
  depending on the at least one likelihood, providing the alternatives to form a target chromaticity cluster of:
    (1) both at least part of the first skin chromaticity cluster and at least part of the second skin chromaticity cluster,
    (2) substantially one of the first or second skin chromaticity clusters, and
    (3) a union of both first and second skin chromaticity clusters; and
  set a white point for the image at least partially based on the skin chromaticity of the point on the target chromaticity cluster
wherein at least two likelihoods are calculated comprising one likelihood corresponding to a darker skin type and another likelihood corresponding to a lighter skin type;
wherein forming a target chromaticity cluster comprises using a portion of the first or second skin chromaticity cluster wherein the portion is proportional to the at least one likelihood;
  wherein the portion is proportional to a corresponding likelihood when the likelihood is less than about 50%;
  wherein the portion is geometrically closest within the cluster and to the other of the first and second skin chromaticity cluster on the color space;
  the instructions when executed, cause the computer to use approximately 100% of the first or second skin chromaticity cluster when a corresponding likelihood is over about 50%;
wherein forming a target chromaticity cluster comprises:
establishing the target chromaticity cluster as approximately equal to the first skin chromaticity cluster when a corresponding likelihood is approximately 100%,
  establishing the target chromaticity cluster as approximately equal to the second skin chromaticity cluster when a corresponding likelihood is approximately 100%,
  establishing the target chromaticity cluster as approximately the union of the first and second skin chromaticity clusters when both of their respective likelihoods are approximately 50%,
  establishing the target chromaticity cluster as the first skin chromaticity cluster plus a proportion of the second skin chromaticity cluster when the likelihood corresponding to the first skin chromaticity cluster is more than about 50%, and wherein the proportion corresponds to a likelihood of the point being found within the second skin chromaticity cluster, and establishing the target chromaticity cluster as the second skin chromaticity cluster plus a proportion of the first skin chromaticity cluster when the likelihood corresponding to the second skin chromaticity cluster is more than about 50%, and wherein the proportion corresponds to a likelihood of the point being found in the first skin chromaticity cluster;
wherein there is two to six skin chromaticity clusters;
wherein the likelihoods are determined by one of:
  using human eye luminance and skin luminance of a detected face, and
  using human eye luminance, lip luminance, and skin luminance of a detected face; and
the instructions when executed, cause the computer to establish an initial location of the skin chromaticity point on the color space, and determine a chromaticity of the skin chromaticity point by applying a correction to the skin chromaticity point to move the skin chromaticity point on the color space to at least one of:
toward the target chromaticity cluster,
to the edge of the target chromaticity cluster, and
to the closest point on the target chromaticity cluster; and
the instructions when executed, cause the computer to determine at least one correction gain for each detected skin-providing object of a plurality of skin-providing objects on the image, and use at least the correction gains to determine a final white point for the image.

* * * * *